350-345 SR

6/3/80 XR 4,205,522

United States Patent [19]

Takami

[11] 4,205,522

[45] Jun. 3, 1980

[54] LIQUID CRYSTAL DISPLAY DEVICE

[75] Inventor: Katsumi Takami, Tokyo, Japan

[73] Assignee: Hitachi, Ltd., Tokyo, Japan

[21] Appl. No.: 903,162

[22] Filed: May 5, 1978

[51] Int. Cl.[2] .......................... G02F 1/13; G04B 19/30

[52] U.S. Cl. ....................................... 368/84; 350/345; 368/226; 368/242

[58] Field of Search ................ 58/50 R, 50 A, 127 R; 340/324 M, 336; 362/29; 350/345

[56] References Cited

U.S. PATENT DOCUMENTS

| | | | |
|---|---|---|---|
| 3,841,083 | 10/1974 | Bercet | 58/50 R |
| 3,950,078 | 4/1976 | Zatsky | 350/345 |
| 4,042,294 | 8/1977 | Billings, Jr. et al. | 350/345 |
| 4,126,384 | 11/1978 | Goodman et al. | 340/345 |

*Primary Examiner*—Vit W. Miska
*Attorney, Agent, or Firm*—Craig & Antonelli

[57] ABSTRACT

A liquid crystal display device, especially, for use in a liquid crystal display watch is disclosed, which is provided with a liquid crystal display element and a reflector comprising a luminescent phosphor, and only in a limited partial area of the reflector corresponding to a specified display portion which should be visible in the dark or at night in the whole time display area of the liquid crystal display element, the luminescent phosphor includes a radioactive nuclide such as promethium ($^{147}Pm$) or tritium ($^{3}H$).

13 Claims, 10 Drawing Figures

LIQUID CRYSTAL DISPLAY DEVICE

This invention relates to liquid crystal display devices capable of displaying letters, numerals and other necessary patterns even at night or in the dark, and more particularly to a liquid crystal display device for use in a liquid crystal display watch or the like of the so-called nighttime display type. The present invention will be described with reference to its application to a liquid crystal display watch, by way of example.

A liquid crystal display watch displays letters, numerals and other necessary patterns representing the time, the day of the week, the date and other necessary information by reflecting external light, and therefore, it is unable to display such patterns in the dark or nighttime.

In an effort to overcome the above drawback, an improved liquid crystal display watch has been proposed which includes an active or self-luminous planar light source in the form of a layer of a phosphorus paint containing a radioactive nuclide dispersed uniformly therein over the entire display area. Such a self-luminous planar light source is disposed on the back side of a liquid crystal display element, so that the patterns can be displayed by the reflection of external light in usual manner in the daytime and by the transmission of radiation emitted from the self-luminous planar light source in the nighttime. However, in order that the self-luminous planar light source containing the radioactive nuclide dispersed uniformly therein over the entire display area of the liquid crystal display element can provide such a luminous intensity that all the letters, numerals and other necessary patterns displayed on the display area of the liquid crystal display element can be sufficiently identified by the naked eye even in the nighttime, the radioactive nuclide must be contained in the phosphorous paint layer in a very large quantity which amounts to an activity ranging from several mCi to several hundred mCi.

FIGS. 1A and 1B are a schematic plan view and a schematic sectional view respectively of a prior art liquid crystal display device used in a liquid crystal display watch of the so-called nighttime display type. Referring to FIGS. 1A and 1B, the prior art liquid crystal display device comprises a liquid crystal display element 1 comprising an upper polarizer 2, an upper glass plate 3, a liquid crystal layer 4 formed essentially of a field effect liquid crystal material, a lower glass plate 5 and a lower polarizer 6. Although not shown, many electrodes for applying an electric field to display the required patterns are disposed on the surfaces of the upper and lower glass plates 3 and 5 engaging with the liquid crystal layer 4 which is sandwiched between these glass plates 3 and 5. Gaseous tritium ($^3H$) is enclosed within a plurality of small glass tubes 7 which are coated on their inner walls with a luminous phosphor such as a compound of zinc sulfide and copper (ZnS: Cu). These glass tubes 7 are bodily buried in a phosphor layer to constitute, together with the phosphor, a self-luminous planar light source which acts also as an external light reflector. The radioactive gas envelopes 7 in the form of the tubes are arranged in the phosphor layer to constitute the self-luminous planar light source which covers the entire display area of the liquid crystal display element 1, and this self-luminous planar light source functions as an external light reflector rather than a light source in a bright spot. A thin plate 8 of aluminum is bonded to the lower surface of the planar light source to serve as a shielding means for the $\beta$-ray radiating downward from the tubes 7 enclosing the tritium gas therein.

The illustrated liquid crystal display watch can display "hour," "minute," "second" and "am (pm)" even in the nighttime as shown in the plan view of FIG. 1 since the self-luminous planar reflector in the form of the phosphor layer containing the radioactive nuclide is disposed on the entire back surface of the liquid crystal display element 1 in the liquid crystal display watch. FIG. 1 illustrates, by way of example, that the time is now 12 o'clock, 48 minutes, 26 seconds p.m. In order to be capable of clearly displaying all of such information even in the nighttime, tritium ($^3H$) with a total activity of 200 mCi or more must be contained in the phosphor layer providing the reflector. However, a liquid crystal display watch containing tritium with such a high activity is not permitted to be practically used. The law in a country, for example, Japan provides for severe restrictions on the use of a radioactive nuclide in a liquid crystal display watch. According to the law in Japan, the activity of a sealed radioactive source for use in a liquid crystal display watch is restricted to be less than 100 $\mu$Ci, and thus, a self-luminous planar light source having a strong activity of the order of mCi as above described cannot be incorporated in a liquid crystal display watch. In some other countries, the law permits the use of tritium ($^3H$) up to an activity of 25 mCi and promethium ($^{147}Pm$) up to an activity of 500 $\mu$Ci although the use is limited to special watches. However, when a planar light source containing tritium or promethium with such a limited activity is used to cover the entire display area of a liquid crystal display watch, it is difficult to provide a sufficiently luminant pattern display. Especially, in the case of promethium, it is impossible to provide a sufficiently distinct display contrast even when promethium is contained in the planar light source in an amount corresponding to the critical allowable limit of 500 $\mu$Ci.

Taking into consideration the aforementioned severe restrictions on the use of such a radioactive nuclide, it is a primary object of the present invention to provide a novel and improved liquid crystal display device which can display the letters, numerals and other necessary patterns even in the nighttime with a minimized activity.

Another object of the present invention is to provide a liquid crystal display device for use in a liquid crystal display watch of the nighttime display type which can provide necessary time display even in the nighttime.

The present invention which attains the above objects is featured by the fact that a self-luminous light source in the form of a luminous phosphor layer containing a radioactive nuclide is disposed only in a limited region of the entire display area of a liquid crystal display element of a liquid cyrstal display watch or the like, which region corresponds to a specific display region required to display necessary patterns even in the nighttime.

The above and other objects, features and advantages of the present invention will become more apparent from the following detailed description of preferred embodiments thereof taken in conjunction with the accompanying drawings, in which.

Generally, "hour," or "hour" and "minute," at the most, are the minimum required information that should be displayed by a watch in the nighttime or while one is asleep, and display of "second," "pm (am)," "date" and/or "day-of-week" is not necessarily required. This is because a person, who makes his activity in the nighttime and wishes to obtain detailed time information other than the "hour" and "minute" information will be generally working in a sufficiently illuminated room or at a place at which external illumination is relatively easily available when so required. In contrast, confirmation of "hour" will generally suffice in most cases when a person awakes in the nighttime while he is asleep. Thus, confirmation of "hour" alone will suffice in the nighttime except for some special circumstances, and confirmation of "minute" in addition to "hour" provides information which is even more sufficient.

For the above reasons, the present invention contemplates the provision of a liquid crystal display device in which a self-luminous light source is disposed in a limited region corresponding to a specific display area portion so as to serve as a source of light for displaying the necessary patterns even when external illumination is not available in the nighttime.

Figure 1A:
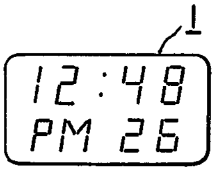
FIG. 1A PRIOR ART
FIGS. 1A and 1B are a schematic plan view and a schematic sectional view respectively showing the structure of a prior art liquid crystal display device used in a liquid crystal display watch of the nighttime display type.
Figure 2A:
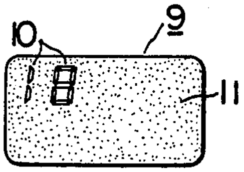
FIGS. 2A and 2B are a schematic plan view and a schematic sectional view respectively showing the structure of an embodiment of the liquid crystal display device according to the present invention.
Figure 1B:
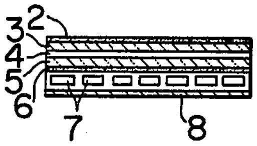
FIG. 1B PRIOR ART
Figure 2B:
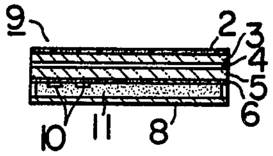

FIGS. 2A and 2B are a schematic plan view and a schematic sectional view respectively of an embodiment of the liquid crystal display device according to the present invention. Referring to FIGS. 2A and 2B, the liquid crystal display device according to the present invention comprises a reflector 9 which forms part of a liquid crystal display element for use in a liquid crystal display watch which is adapted to provide the "hour" display only in the nighttime. The parts bearing the reference numerals 2 to 6 and 8 are the same as those shown in FIGS. 1A and 1B. The reflector 9 includes segments 10 of a self-luminous phosphor disposed to register with the corresponding segments of the "hour" display patterns arranged in the form of the numerals 1 and 8. This self-luminous phosphor is prepared by dispersing a $\beta$-ray radioactive source such as solid or powdery tritium ($^{3}H$) or promethium ($^{147}Pm$) or an $\alpha$-ray radioactive source such as americium (Am) in a phosphor such as ZnS: Cu. The remaining portion 11 of the reflector 9 is formed of a layer of similar phosphor such as ZnS: Cu which does not contain such a radioactive nuclide. It will thus be seen that the radioactive nuclide is contained only in the limited portions of the phosphor layer of the reflector 9 corresponding to the segments of the "hour" display numeral patterns on the display area of the liquid crystal display device, and therefore, the amount of the required radioactive nuclide is very small according to the embodiment of the present invention. The inclusion of the radioactive nuclide in such a very small amount in the phosphor layer forming the reflector 9 does not cause any substantial changes in the color and reflection factor of the phosphor layer. Thus, in the embodiment of the present invention, the phosphor layer portions 10 and 11 of the reflector 9 function as a means for uniformly reflecting external light in the daytime, while the phosphor segments 10 in the reflector 9 disposed to register with the corresponding segments of the "hour" display numeral patterns function as a self-luminous light source which emits light to provide the "hour" display on the display area in the nighttime. The radioactive nuclide exhibiting an activity up to 100 mCi which is the critical limit of the activity in a country, for example, Japan, or promethium ($^{147}Pm$) exhibiting an activity up to 500 $\mu$Ci which is the critical limit of the activity in some other countries, can be applied to the limited region of the reflector 9 at the location corresponding to the "hour" display numeral patterns, so that a liquid crystal display watch of the night display type can be realized which can provide the required "hour" display in a mode sufficiently easily identified by the eye and which does not violate the severe restrictions set forth by the law. Further, the radioactive nuclide may also be applied to the phosphor layer portions of the reflector corresponding to the "minute" display numeral patterns in addition to the phosphor layer portions of the reflector corresponding to the "hour" display numeral patterns although the light intensity will be slightly reduced.

In other embodiments or modifications of the first embodiment of the present invention, a layer of the self-luminous phosphor containing the radioactive nuclide forms part of the reflector for defining a limited partial region of approximately rectangular shape so that the numeral display patterns formed by the segments representing the numerals 1 and 8 for providing the "hour" display or the "hour" display and "minute" display among all the displays can be completely included within this partial region. This partial region may be divided so that each divided region encompasses the corresponding one of the plural numeral display patterns or may singly encompass the plural numeral display patterns. The partial region is referred to as an "hour" display region when it includes the "hour" display and as an "hour" and "minute" display region when it includes both the "hour" display and the "minute" display. The remaining portion of the reflector is formed of the same phosphor layer but not including the radioactive nuclide.

Figure 3:
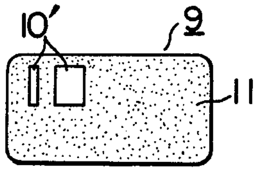
FIG. 3 is a schematic plan view of another embodiment of the present invention.

FIG. 3 is a schematic plan view of one of such modifications. Referring to FIG. 3, the self-luminous phosphor forms a partial region 10' of the reflector 9 corresponding to the "hour" display region, and this partial region 10' is divided into two sub-regions for displaying the units digit and the tens digit of "hour" respectively by the light emitted from independent self-luminous light sources. The same phosphor but not containing the radioactive nuclide forms the remaining portion 11 of the reflector 9. Needless to say, such self-luminous light sources may be provided at the location corresponding to the "hour" and "minute" display region instead of being provided only at the location corresponding to the "hour" display region. In the modification shown in FIG. 3, the radioactive nuclide exhibiting the limited total activity of 100 $\mu$Ci according to the law of Japan (or, in the case of promethium, exhibiting the limited total activity of 500 $\mu$Ci according to the law of some other countries) is uniformly dispersed in the limited region of enlarged area corresponding to the "hour" display region or the "hour" and "minute" display region. Thus, although the light intensity in the nighttime is reduced compared with the embodiment shown in FIGS. 2A and 2B, the so-called floating display of the "hour" indicating numerals within the area of the generally rectangular self-luminous light sources improves the quality of the "hour" display and exhibits rather a better effect for the identification of the time. Further, the liquid crystal display device shown in FIG. 3 can be more simply and inexpensively manufactured than that shown in FIGS. 2A and 2B since the phosphor layer containing the radioactive nuclide need not be finely divided into the segments.

In the modification shown in FIG. 3, the self-luminous phosphor layer is divided into two portions to provide independent self-luminous light sources for the units digit display and tens digit display respectively of the "hour" display. However, a non-divided continuous self-luminous planar light source encompassing both these "hour" digit display regions may be provided so as to simplify the manufacturing process. Further, a non-divided continuous self-luminous planar light source of generally rectangular shape encompassing the entire "hour" and "minute" display region may be provided.

Among a variety of liquid crystal display watches, there are liquid crystal display watches of small size which are not provided with the function of displaying "second," "date" and "day-of-week" and are originally only adapted for displaying "hour" and "minute." The present invention is also applicable to such a liquid crystal display watch. In this application, a non-divided self-luminous planar light source encompassing the marginal edges of the "hour" display region or the "hour" and "minute" display region in the entire display area of the liquid crystal display element is provided so as to reduce the amount of the radioactive nuclide used while ensuring a luminous display in the nighttime.

Figure 4A:
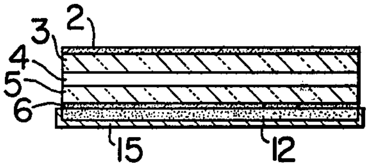
FIGS. 4A and 4B are a schematic sectional view and a schematic plan view respectively of still another embodiment of the present invention.
Figure 4B:
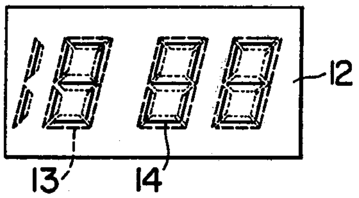

FIGS. 4A and 4B are a schematic sectional view and a schematic plan view respectively of another embodiment of the liquid crystal display device according to the present invention. In FIGS. 4A and 4B, the parts bearing the reference numerals 2 to 6 are the same as those shown in FIGS. 2A and 2B. Referring to FIGS. 4A and 4B, the device comprises a light stored type luminous phosphor layer 12 which acts as a reflector in the daytime. FIG. 4B shows, for convenience of explanation, the shape of time display pattern segments (numeral patterns) 13 provided on the upper and lower glass plates 3 and 5, and such segments 13 are represented by dotted lines since they are not actually present on the light stored type luminous phosphor layer 12. A self-luminous phosphor 14 is disposed in the phosphor layer 12 along the centerline of the portions corresponding to the segments 13. This self-luminous phosphor 14 is provided by adding a radioactive nuclide such as promethium ($^{147}$Pm) to the same phosphor as that forming the light stored type luminous phosphor layer 12. The self-luminous phosphor 14 is desirably disposed in a linear pattern extending partly along the centerline of each segment 13. The portions except those occupied by the self-luminous phosphor 14 are filled with the light stored type luminous phosphor 12. This linear pattern of the self-luminous phosphor 14 is applied to the "hour" display region and "minute" display region and is not applied to the "day-of-week" display region, "second" display region and "date" display region. A thin plate 15 of aluminum is provided to shield against the $\beta$-ray radiating from the radioactive nuclide which may be promethium ($^{147}$Pm).

In the embodiment shown in FIGS. 4A and 4B, the self-luminous phosphor 14 does not form a planar light source like that shown in the aforementioned embodiments, but is disposed in a linear pattern in the specific display regions required for the night display. For example, it is applied only to the segments representing "hour" and "minute." In addition, due to the fact that this self-luminous phosphor 14 is disposed in the limited portions of these segments, the total activity of the radioactive nuclide mixed in the light stored type luminous phosphor with a high concentration can be limited to less than the critical light of 100 $\mu$Ci. In spite of the total activity above specified, the contrast can be sufficiently improved. Further, the light emitting from the self-luminous phosphor containing the radioactive nuclide of high concentration penetrates into the adjoining portions of the light stored type luminous phosphor to cause emission of luminescence and phosphorescence. Therefore, the self-luminous phosphor applied in the linear pattern may be viewed as if it were a light source of strip-like pattern since the portions adjoining the phosphor emit luminescence and phosphorescence. The light stored type luminous phosphor layer having the self-luminous phosphor disposed therein acts as a uniformly reflecting reflector in the daytime since the material of these phosphors is the same.

In the liquid crystal display device according to the present invention, a switchable electric drive circuit is provided so that, in the daytime, application of the electric field to the selected segments provides the black display of letters and numerals in the customary manner, while in the nighttime, the segments to which no electric field is applied luminesce to display the required numerals. A push button switch is provided as a part of the watch for switching the electric drive circuit.

The segments to which the electric field is applied in the nighttime do not luminesce and remain black by shielding the light from the self-luminous phosphor. Thus, in the nighttime, these segments cannot be clearly distinguished from the adjoining black portions which are sensed black due to no incidence of external light.

Figure 5A:
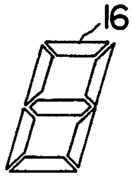
FIGS. 5A, 5B and 5C are schematic plan views of part of other embodiments of the present invention.
Figure 5B:
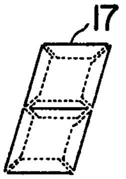
Figure 5C:
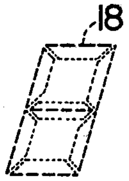

In the embodiment shown in FIGS. 4A and 4B, the self-luminous phosphor is applied in a linear pattern along the centerline of the segments required for the time display in the nighttime. In a modification shown in FIG. 5A, the self-luminous phosphor is applied only along the inner and outer edges of the segments of the time display numeral patterns in a linear pattern as indicated by 16, and the remaining portions of the segments are filled with the light stored type luminous phosphor. In another modification shown in FIG. 5B, the self-luminous phosphor is applied only along the outer edges of the segments as indicated by 17. In still another modification shown in FIG. 5C, the self-luminous phosphor is applied only along the outer edges of the segments in a dotted pattern instead of the linear pattern. In this case, the total activity of the radioactive nuclide contained in the self-luminous phosphor does not amount to the critical limit of 100 $\mu$Ci even when the concentration thereof is considerably increased.

What is claimed is:

1. A liquid crystal display device comprising a liquid crystal display element having liquid crystal means for displaying letters, numerals and other necessary patterns on a display area of said element, and a reflector in the form of a phosphor layer disposed on the back side of said liquid crystal display element, said phosphor layer containing a radioactive nuclide dispersed within a phosphor material only in a limited partial region of said reflector corresponding to a specific display region required to display necessary time information in the nighttime in the display area of said liquid crystal display element, the amount of radioactive nuclide contained in said phosphor layer being limited to that which will exhibit an acceptable limited total activity and providing light intensity sufficient to identify by the eye the specific display region.

2. A liquid crystal display device for use in a liquid crystal display watch as claimed in claim 1, wherein said phosphor layer forming said reflector contains said radioactive nuclide only in a limited partial region of said reflector corresponding to the "hour" display region of the display area of said liquid crystal display element.

3. A liquid crystal display device for use in a liquid crystal display watch as claimed in claim 1, wherein said phosphor layer forming said reflector contains said radioactive nuclide only in a limited partial region of said reflector corresponding to the "hour" and "minute" display region of the display area of said liquid crystal display element.

4. A liquid crystal display device for use in a liquid crystal display watch as claimed in claim 1, wherein said phosphor layer forming said reflector contains said radioactive nuclide only in a limited partial region of said reflector corresponding to the "hour" display numeral pattern portions of the display area of said liquid crystal display element.

5. A liquid crystal display device for use in a liquid crystal display watch as claimed in claim 1, wherein said phosphor layer forming said reflector contains said radioactive nuclide only in a limited partial region of said reflector corresponding to the "hour" and "minute" display numeral pattern portions of the display area of said liquid crystal display element.

6. A liquid crystal display device according to claim 1, wherein the remaining region of said reflector contains said phosphor material.

7. A liquid crystal display device for use in a liquid crystal display watch as claimed in claim 1, wherein said radioactive nuclide is selected from the group consisting of promethium ($^{147}Pm$) and tritium ($^{3}H$).

8. A liquid crystal display device for use in a liquid crystal display watch as claimed in claim 1, wherein said reflector disposed on the back side of said liquid crystal display element is in the form of a light stored type luminous phosphor layer, and said phosphor layer forming said reflector contains said radioactive nuclide dispersed within a phosphor material only in limited portions of said reflector corresponding to the portions of the segments disposed in the time display region which is required to display necessary time information in the nighttime in the display area of said liquid crystal display element.

9. A liquid crystal display device for use in a liquid crystal display watch as claimed in claim 8, wherein said phosphor layer forming said reflector contains said radioactive nuclide in a linear pattern in limited portions of said reflector corresponding to the centerline portions of the segments disposed in the "hour" display region of the display area of said liquid crystal display element.

10. A liquid crystal display device for use in a liquid crystal display watch as claimed in claim 8, wherein said phosphor layer forming said reflector contains said radioactive nuclide in a linear pattern in limited portions of said reflector corresponding to the centerline portions of the segments disposed in the "hour" and "minute" display region of the display area of said liquid crystal display element.

11. A liquid crystal display device for use in a liquid crystal display watch as claimed in claim 8, wherein said phosphor layer forming said reflector contains said radioactive nuclide in a linear pattern in limited portions of said reflector corresponding to the edge portions of the segments disposed in the "hour" and "minute" display region of the display area of said liquid crystal display element.

12. A liquid crystal display device for use in a liquid crystal display watch as claimed in claim 8, wherein said phosphor layer forming said reflector contains said radioactive nuclide in a dotted pattern in limited portions of said reflector corresponding to the edge portions of the segments disposed in the "hour" and "minute" display region of the display area of said liquid crystal display element.

13. A liquid crystal display device for use in a liquid crystal display watch as claimed in claim 8, wherein said radioactive nuclide is selected from the group consisting of promethium ($^{147}Pm$) and tritium ($^{3}H$).

* * * * *